(12) United States Patent
Ong et al.

(10) Patent No.: US 6,592,926 B2
(45) Date of Patent: Jul. 15, 2003

(54) HYDROCOLLOID CONFECTIONERY

(75) Inventors: Mei Horng Ong, York (GB); Andrew Steve Whitehouse, Harrogate (GB)

(73) Assignee: Nestec S.A., Vevey (CH)

( * ) Notice: Subject to any disclaimer, the term of this patent is extended or adjusted under 35 U.S.C. 154(b) by 220 days.

(21) Appl. No.: 09/823,907

(22) Filed: Mar. 30, 2001

(65) Prior Publication Data

US 2001/0036499 A1 Nov. 1, 2001

Related U.S. Application Data

(63) Continuation of application No. PCT/EP99/06896, filed on Sep. 17, 1999.

(30) Foreign Application Priority Data

Oct. 1, 1998 (GB) .............................................. 9821387

(51) Int. Cl.[7] .......................... A23G 3/00; A23L 1/0532
(52) U.S. Cl. ...................... 426/575; 426/658; 426/660; 426/512; 426/516; 426/519
(58) Field of Search ................................. 426/575, 660, 426/658, 512, 516, 519

(56) References Cited

U.S. PATENT DOCUMENTS

| 5,244,686 | A | * | 9/1993 | Fukuyama et al. | ......... 426/575 |
|---|---|---|---|---|---|
| 5,429,830 | A | * | 7/1995 | Janovsky et al. | ............. 426/94 |
| 5,607,716 | A | | 3/1997 | Doherty et al. | ............. 426/660 |
| 6,063,915 | A | * | 5/2000 | Hansen et al. | ............... 536/114 |
| 6,214,376 | B1 | * | 4/2001 | Gennadios | ................... 424/451 |
| 6,340,473 | B1 | * | 1/2002 | Tanner et al. | ............... 424/451 |
| 6,531,174 | B2 | * | 3/2003 | Barrett et al. | ............... 426/573 |
| 2002/0076478 | A1 | * | 6/2002 | Grazela et al. | ............. 426/660 |

FOREIGN PATENT DOCUMENTS

| EP | 0515864 A1 | | 12/1992 |
|---|---|---|---|
| EP | 0812545 A1 | | 12/1997 |
| WO | WO 97/41738 | | 11/1997 |
| WO | WO 00/19836 | * | 4/2000 |

OTHER PUBLICATIONS

Krishnamurthy Institute of Algology, Mahalingapuram, Chennai–600 034 National Workshop on "Carrageenan and Carrageenophytes", Nov. 23–25, 2002, Department of Ocean Development, Government of India, New Delhi.*

* cited by examiner

*Primary Examiner*—Nina Bhat
(74) *Attorney, Agent, or Firm*—Winston & Strawn

(57) ABSTRACT

A hydrocolloid confectionery product that includes, as a gelling agent, comprising iota-carrageenan or a mixture of carrageenans containing more than 50% iota-carrageenan in an amount sufficient to provide characteristics and properties of the product that are essentially the same as in hydrocolloid confectionery products that include gelatin as a gelling agent. Also, a process for making the hydrocolloid confectionery.

15 Claims, No Drawings

HYDROCOLLOID CONFECTIONERY

CROSS-REFERENCE TO RELATED APPLICATIONS

This application is a continuation of the U.S. national stage designation of International application PCT/EP99/06896 filed Sep. 17, 1999, the content of which is expressly incorporated herein by reference thereto.

FIELD OF INVENTION

The present invention relates to hydrocolloid confectionery and more especially to hydrocolloid confectionery products containing one or more hydrocolloids, generally referred to as gums and jellies.

BACKGROUND OF THE INVENTION

Hydrocolloid confectionery includes sugar gels which are products comprising a gelling agent in a sugar/glucose syrup system, such as, for instance, gums and pastilles, and water gels which are products comprising a gelling agent in water, such as, for instance, table jelly. Hydrocolloid confectionery now represents about half of the sugar confections sold and their popularity continues to grow. Hydrocolloids are the key ingredients of this class of confectionery. They gel and thicken but also stabilize by preventing syneresis, fixing flavors and inhibiting sugar crystallization, providing transparency, brilliance, and adhesion, and for ease of foaming for aerated jellies.

Some examples of hydrocolloids used in hydrocolloid confectionery are agar agar (agarose), xanthan gum, gellan gum, gum arabic, pectin, gelatin, carrageenan, and modified and/or unmodified starches. For example, EP-A-0515864 claims a water and sugar based high solids confectionery having good flavor and texture comprising at least 80% total solids wherein the carbohydrate content is at least 70% of the total solids, a cationic reactive and thermosensitive hydrocolloid; a cation solids, a cationic reactive and thermosensitive hydrocolloid; a cation containing edible material; and up to 20% fat, said confectionery having a water activity below 0.65 Aw and a pH from 3.0 to 8.5. Also, EP-A-0812545 claims a good product for human or animal consumption made by cooker extrusion, said product being expanded, containing between 0.1 and 3% of a hydrocolloid or a mixture thereof and having a density comprised between 100 and 1200 g/l.

One of the most common hydrocolloids used in hydrocolloid confectioneries is gelatin, which is used primarily as a gelling agent and which imparts to the hydrocolloid confectionery a unique gelatin texture especially desirable to consumers. As food-grade gelatin is obtained from bovine or porcine raw materials, and the use of gelatin is undesirable not only because of concerns about bovine spongiform encephalopathy (i.e. "BSE" or "mad-cow disease), but also for the vegetarian population, as well as for certain ethnic groups who have concerns about the nature of meat used in certain food products and/or who observe certain dietary constraints concerning the consumption of meat and dairy products. In addition gelatin, being a protein, is highly sensitive to thermal and high acidic treatment and undergoes degradation causing loss in its functional properties, reduced cooking efficiencies, loss of active ingredient, and possible fouling which necessitates frequent cleaning.

Attempts have been made to replace gelatin by one or more of the above hydrocolloids in a variety hydrocolloid confectionery materials but with little success in the case of edible gums. For example, U.S. Pat. No. 5,422,134 describes a comestible product comprising a gelling agent composition comprising depolymerised locust bean gum having an intrinsic viscosity of from 1.3 to 2.3 dug and a polysaccharide or mixture of polysaccharides that forms a gel in aqueous solution with locust bean gum. Example 6 describes the preparation of a wine gum comprising such a gelling agent but, when following the procedural steps of the Example, a weak and unstable gel whose texture was not gelatin like at all was obtained. Thus, improvements in gelling agents for use in hydrocolloid confectioneries are needed.

SUMMARY OF THE INVENTION

The present invention relates to the surprising discovery that by using iota-carrageenan or a mixture of carrageenans containing predominantly iota-carrageenan instead of gelatin as a gelling agent in a hydrocolloid confectionery product, the disadvantages of gelatin can be overcome while still providing the gelatin texture that is preferred by many consumers. Iota-carrageenan was found to impart elastic, bouncy, long lasting and non-sticky characteristics similar to gelatin-like texture to the hydrocolloid confectionery products to which it was added.

The present invention also relates to hydrocolloid confectionery products comprising iota-carrageenan or a mixture of carrageenans containing more than 50% iota-carrageenan since these components imput a gelatin texture to such products.

DETAILED DESCRIPTION OF THE INVENTION

Hydrocolloid confectionery products include sugar gels and water gels, for example, hard, soft and foamed gums, wine gums, laces, tubes and corrugated strips, jujubes, fruit leathers, fruit pastilles, lemon slices, pastilles, Turkish delight, gummi bears, jelly babies, table jellies, savoury gels, etc.

Carrageenan is a polysaccharide gelling agent that is usually extracted from seaweed and the extraction usually yields a mixture of at least two types, i.e. two or more of the iota, kappa and lambda types, the amounts of each depending on the seaweed used and the extraction conditions. Carrageenan usually also contains salt in an amount up to about 3% by weight. In this invention, a mixture of carrageenans containing at least 60% iota-carrageenan is advantageously used, with preferably at least 70%, more preferably at least 80% and especially at least 90% iota-carrageenan by weight based on the total weight of the carrageenan utilized in the hydrocolloid confectionery product. The iota-carrageenan gives the dominant gelatin like behavior to the hydrocolloid confectionery product.

The amount of carrageenan in the hydrocolloid confectionery product may be from 0.1% to 5.0%, preferably from 0.25% to 4% and more preferably from 0.5% to 3% by weight based on the weight of the hydrocolloid confectionery product.

If desired, one or more other hydrocolloids may be present together with the carrageenan in the hydrocolloid confectionery product, e.g., agar agar, xanthan gum, locust bean gum, gellan gum, gum arabic, pectin, gelatin, kappa-carrageenan, guar gum, or modified or unmodified starches, e.g. maize or potato starch. The use of one or more other hydrocolloids together with the carrageenan enables the creation of different gelling characteristics as desired and/or may be used to manipulate the textural properties.

The hydrocolloid confectionery product of the present invention typically comprises in addition to iota-carrageenan, conventional amounts of water, sugar, glucose syrup, gelatin, other carrageenans and/or other hydrocolloids, color, flavor and food grade acids.

When the hydrocolloid confectionery product of the present invention is a sugar gel, this usually contain from 30% to 90%, preferably from 40% to 70% of a sugar syrup by weight based on the weight of the hydrocolloid confectionery product e.g., corn syrup, glucose syrup, invert syrup, high fructose syrup, sucrose, fructose, maltose, and/or sugar replacers, e.g. isomalt, maltitol, sorbitol, mannitol, lactitol, or trehalose. Different types of sugar systems can be used to manipulate the final textural properties of the hydrocolloid confectionery product. This is used to influence the viscosity and processing parameters e.g. depositing temperature.

In addition to the carrageenan and the sugar systems and optionally together with other hydrocolloids, the hydrocolloid confectionery product may contain the usual ingredients such as a food-acceptable acid, e.g. lactic acid, malic acid, tartaric acid, ascorbic acid, hydrochloric acid or citric acid in an amount of from 0.5% to 5% and preferably from 1% to 2.5% by weight based on the weight of the hydrocolloid confectionery product; a food-acceptable acid salt in an amount of from 0.25% to 2.5% and preferably from 0.5% to 1.5% by weight based on the weight of the hydrocolloid confectionery product; a humectant such as glycerol, flavor, color, protein, e.g. egg white, or milk protein in the case of aerated system, in an amount of from 0.1% to 1% and preferably from 0.2 to 0.5% by weight based on the weight of the hydrocolloid confectionery product; and water. The amount of water in the finished hydrocolloid confectionery product may be from 10% to 25% and preferably is from 12.5% to 22.5% by weight based on the weight of the hydrocolloid confectionery product.

The hydrocolloid confectionery sugar gel products of the present invention may be prepared by conventional methods. For example, the ingredients may be blended to form a syrup, then cooked, shaped and, if necessary, dried. Drying is usually required to achieve the final total solids and the final texture is influenced by drying process. Drying is not required if the liquor is deposited at the total solids of the finished products or if it is processed by starchless molding. As for the ingredients, the processing method will affect the final texture of products.

The ingredients may be blended with agitation, e.g., stirring. A syrup of the sugars, carrageenan, and water are preferably blended first followed by the addition of the remaining components, e.g, acid, flavor, color, humectants, etc. to give a syrup mixture having a solids content of from 60% to 90% and preferably from 65% to 75% by weight based on the weight of the syrup.

The syrup mixture may be cooked by open pan boiling, in a jet cooker, coil cooker, plate heat exchanger or a cooker extruder. Depending on the cooking equipment, ingredients used in the formulation, and their concentrations at forming, the operating conditions will vary. The selection of optimum processing conditions is well within the level of a skilled artisan.

The shaping may be carried out, for instance, by filling molds by casting, depositing (starch or starchless) or injection, slabbing (flat or contoured), layering or extrusion.

The iota-carrageenan or mixture of carrageenans containing more than 50% iota-carrageenan sets rapidly or instantly and causes a quick forming during the depositing step. The setting time depends on parameters such as the temperature, concentration, pH, ionic strength etc. The setting temperature is preferably at least 95° C.

The shaped product may be dried, for instance by stoving which is a dehydration process at a specific temperature, humidity and time which parameters may be readily selected by skilled artisans. Depending on whether or not the cooked syrup mixture is subjected to a stoving process, different gumminess and/or elasticity properties may be obtained.

The product may also be subjected to one or more of other finishing treatments as desired depending on the product and the requirements, e.g. washing, destarching, steaming, sanding, crystallization, and oiling and polishing, or engrossing with other sugar confectionery products.

The final solids content may be from 75% to 90% and preferably from 77.5% to 87.5% by weight based on the weight of the hydrocolloid confectionery.

By using different mixtures of ingredients, different processing methods or different shaping methods, hydrocolloid confectionery products with completely novel textures can be produced.

The hydrocolloid confectionery water gel products of the present invention may be prepared by blending to form a syrup, boiling and, if necessary, drying.

EXAMPLES

The following Examples further illustrate the preferred embodiments of the present invention.

Example 1

The following ingredients are used for a Gummi type product:

| | |
|---|---|
| Glucose syrup | 60% |
| Water | 20% |
| Sucrose | 14% |
| Carrageenan (predominantly iota carrageeanan) | 2.0% |
| Citric acid | 1.7% |
| Tri-sodium citrate | 0.9% |
| Flavour | 0/2% |

Pre heat glucose syrup and water (with Tri-sodium citrate added), to 600 C., then add the carrageenan (Genugel carrageenan type X-8300) to the solution while stirring with a high speed mixer to ensure complete dispersion, and then heat to boil. Add sugar to the slurry and boil to the required total solids. The total solids of liquors may be in the range from 60–90% depend on the subsequent forming and moulding methods.

The Gummi type product has an elastic, bouncy, non-sticky, long-lasting and cohesive eating property. The texture is similar to a Gummi product prepared using gelatin.

Example 2

A similar procedure to that described in Example 1 is followed but with the addition of 1% of modified maize starch. The texture is similar to confectionery having a hard gum characteristic.

Comparative Example

A similar procedure to that described in Example 1 is followed but using a carrageenan of predominantly kappa type instead of the carrageenan there used. The product does not have the elastic and bouncy texture but rather a short or less stringy texture which is not acceptable.

What is claimed is:

1. A hydrocolloid confectionery product that includes, as a gelling agent, iota-carrageenan or a mixture of carrageenans containing more than 50% iota-carrageenan in an amount sufficient to provide characteristics and properties of the product that are essentially the same as in hydrocolloid confectionery products that include gelatin as a gelling agent.

2. A hydrocolloid confectionery product according to claim 1 wherein the amount of iota-carrageenan in the product is from 0.1% to 5% by weight by weight based on the weight of the product.

3. A hydrocolloid confectionery product according to claim 1 wherein one or more other hydrocolloids are present together with the iota-carrageenan.

4. A hydrocolloid confectionery product according to claim 3 wherein the other hydrocolloid is one or more of agar agar, xanthan gum, locust bean gum, gellan gum, gum arabic, pectin, gelatin, kappa-carrageenan, guar gum or a starch or protein that includes milk and cereal.

5. A hydrocolloid confectionery product according to claim 1 which contains from 30% to 90% of a sugar syrup by weight based on the weight of the product.

6. A hydrocolloid confectionery product according to claim 1 amount of water of from 10% to 25% by weight based on the weight of the hydrocolloid confectionery product.

7. A gelatin free hydrocolloid confectionery product comprising, as ingredients, a sugar syrup in an amount of 30 to 90%, a food acceptable acid in an amount of 0.5 to 5%, a food acceptable acid salt in an amount of 0.25 to 2.5%, a humectant in an amount of 0.1 to 1%, water in an amount of between 10 and 25%, and a gelling agent of iota-carrageenan or a mixture of carageenans containing more than 50% iota-carageenans, the gelling agent being present in an amount of 0.1 to 5%, with each percent being a weight percent based on the weight of the product.

8. A hydrocolloid confectionery product according to claim 7 wherein one or more other hydrocolloids are present together with the iota-carrageenan.

9. A hydrocolloid confectionery product according to claim 8 wherein the other hydrocolloid is one or more of agar agar, xanthan gum, locust bean gum, gellan gum, gum arabic, pectin, gelatin, kappa-carrageenan, guar gum or a starch or protein that includes milk and cereal.

10. A process for the preparation of a hydrocolloid confectionery product as claimed in claim 7 which comprises blending the ingredients to form a syrup mixture, cooking the syrup mixture, and shaping the cooked syrup mixture to form the product with, if necessary, drying.

11. A process according to claim 10 wherein the ingredients are blended with agitation to provide a syrup mixture having a solids content of from 60% to 90% by weight based on the weight of the syrup mixture and the syrup mixture is cooked to a solids content of from 75% to 90% by weight based on the weight of the ingredients in the cooked syrup mixture.

12. A process according to claim 10 wherein the syrup is cooked by open pan boiling, or in a jet cooker, coil cooker, plate heat exchanger or a cooker extruder.

13. A process according to claim 10 wherein the product is shaped by filling mold casting, starch or starchless depositing, injection, flat or contoured slabbing, layering, or extrusion.

14. A process according to claim 10 wherein one or more other hydrocolloids are present together with the iota-carrageenan.

15. A hydrocolloid confectionery product according to claim 14 wherein the other hydrocolloid is one or more of agar agar, xanthan gum, locust bean gum, gellan gum, gum arabic, pectin, gelatin, kappa-carrageenan, guar gum or a starch or protein that includes milk and cereal.

* * * * *

UNITED STATES PATENT AND TRADEMARK OFFICE
CERTIFICATE OF CORRECTION

PATENT NO. : 6,592,926 B2
DATED : July 15, 2003
INVENTOR(S) : Ong et al.

It is certified that error appears in the above-identified patent and that said Letters Patent is hereby corrected as shown below:

<u>Column 5,</u>
Line 13, change "by weight by weight based on" to -- by weight based on --,
Line 27, change "claim 1 amount of water" to -- claim 1 wherein the amount of water --,
Line 35, change "iota-carageenan" to -- iota-carrageenan --,
Line 36, change "carageenans" to -- carrageenans --, and
Line 37, change "iota-carageenans," to -- iota-carrageenans, --, Signed and Sealed this Thirteenth Day of April, 2004

JON W. DUDAS
*Acting Director of the United States Patent and Trademark Office*